United States Patent
Overhultz et al.

(10) Patent No.: US 7,535,337 B2
(45) Date of Patent: May 19, 2009

(54) SYSTEMS AND METHODS FOR MONITORING OPEN STOCK MERCHANDISING

(75) Inventors: Gary L. Overhultz, River Forest, IL (US); John W. Pyne, Erie, CO (US); Gordon E. Hardman, Boulder, CO (US)

(73) Assignee: Goliath Solutions, LLC, Chicaago, IL (US)

(*) Notice: Subject to any disclaimer, the term of this patent is extended or adjusted under 35 U.S.C. 154(b) by 261 days.

(21) Appl. No.: 11/500,075

(22) Filed: Aug. 7, 2006

(65) Prior Publication Data

US 2007/0035380 A1    Feb. 15, 2007

Related U.S. Application Data

(63) Continuation-in-part of application No. 11/281,283, filed on Nov. 17, 2005, now Pat. No. 7,233,241, and a continuation-in-part of application No. 11/281,859, filed on Nov. 17, 2005.

(60) Provisional application No. 60/629,496, filed on Nov. 19, 2004, provisional application No. 60/629,216, filed on Nov. 18, 2004.

(51) Int. Cl.
    *G05B 19/00* (2006.01)
(52) U.S. Cl. .................... 340/5.91; 340/539.1; 235/383
(58) Field of Classification Search .............. 340/568.8, 340/572.1, 539.1, 539.22, 5.92, 825.49, 666, 340/686.1, 5.91; 235/383
See application file for complete search history.

(56) References Cited

U.S. PATENT DOCUMENTS

| | | | |
|---|---|---|---|
| 4,389,157 | A | 6/1983 | Bernard et al. |
| 4,483,459 | A | 11/1984 | Taylor et al. |
| 4,992,940 | A | 2/1991 | Dworkin |
| 5,407,050 | A | 4/1995 | Takemoto et al. |
| 5,493,107 | A | 2/1996 | Gupta et al. |
| 5,730,320 | A | 3/1998 | David |
| 5,771,005 | A | 6/1998 | Goodwin |
| 5,793,029 | A | 8/1998 | Goodwin |
| 5,841,811 | A | 11/1998 | Song |

(Continued)

*Primary Examiner*—Benjamin C Lee
*Assistant Examiner*—Hongmin Fan
(74) *Attorney, Agent, or Firm*—Jones Day

(57) ABSTRACT

In accordance with the teachings described herein, systems and methods are described for monitoring the open stock merchandising. A product label may be used that includes an electronic identification device that outputs information identifying one or more products to be stocked on one or more retail display structures, such as a shelf. A wireless communication device may be used that communicates with a wireless communication system. The product label may also include one or more connectors for electrically coupling the electronic identification device to the wireless communication. The wireless communication device may be configured to receive the information identifying the one or more products via the one or more connectors and wirelessly communicate the information to the wireless communication system. The information may be used to determine if a first product is adjacent to a second product on one or more retail display structures.

26 Claims, 9 Drawing Sheets

U.S. PATENT DOCUMENTS

| | | |
|---|---|---|
| 6,253,190 B1 | 6/2001 | Sutherland |
| 6,264,104 B1 | 7/2001 | Jenkins et al. |
| 6,543,688 B1 | 4/2003 | Massaro |
| 6,601,764 B1 | 8/2003 | Goodwin |
| 6,610,379 B1 | 8/2003 | Adams et al. |
| 6,669,089 B2 | 12/2003 | Cybulski et al. |
| 6,669,092 B2 | 12/2003 | Leanheart et al. |
| 6,693,539 B2 | 2/2004 | Bowers et al. |
| 6,693,541 B2 | 2/2004 | Egbert |
| 6,696,920 B1 | 2/2004 | Goodwin et al. |
| 6,715,675 B1 | 4/2004 | Rosenfeld |
| 6,717,516 B2 | 4/2004 | Bridgelall |
| 6,736,316 B2 | 5/2004 | Neumark |
| 6,747,560 B2 | 6/2004 | Stevens |
| 6,749,116 B2 * | 6/2004 | Massaro ..................... 235/383 |
| 6,768,419 B2 | 7/2004 | Garber et al. |
| 6,796,508 B2 | 9/2004 | Muller |
| 6,824,065 B2 | 11/2004 | Boone et al. |
| 6,827,256 B2 | 12/2004 | Stobbe |
| 6,840,440 B2 | 1/2005 | Uozumi et al. |
| 6,843,415 B2 | 1/2005 | Vogler |
| 6,844,821 B2 | 1/2005 | Swartzed et al. |
| 6,848,616 B2 | 2/2005 | Tsirline et al. |
| 6,951,305 B2 | 10/2005 | Overhultz et al. |
| 6,978,975 B1 * | 12/2005 | Magnusson ................. 248/249 |
| 2003/0004784 A1 * | 1/2003 | Li et al. ........................ 705/10 |
| 2003/0174099 A1 * | 9/2003 | Bauer et al. ................. 343/893 |
| 2004/0069852 A1 | 4/2004 | Seppinen et al. |
| 2004/0117243 A1 | 6/2004 | Chepil |
| 2005/0021561 A1 | 1/2005 | Noonan |
| 2005/0056091 A1 | 3/2005 | Overhultz et al. |
| 2005/0258955 A1 | 11/2005 | Glockler et al. |
| 2005/0258966 A1 | 11/2005 | Wuan |
| 2005/0283404 A1 | 12/2005 | Young |
| 2006/0015408 A1 | 1/2006 | Brown |
| 2006/0103534 A1 | 5/2006 | Arms et al. |

* cited by examiner

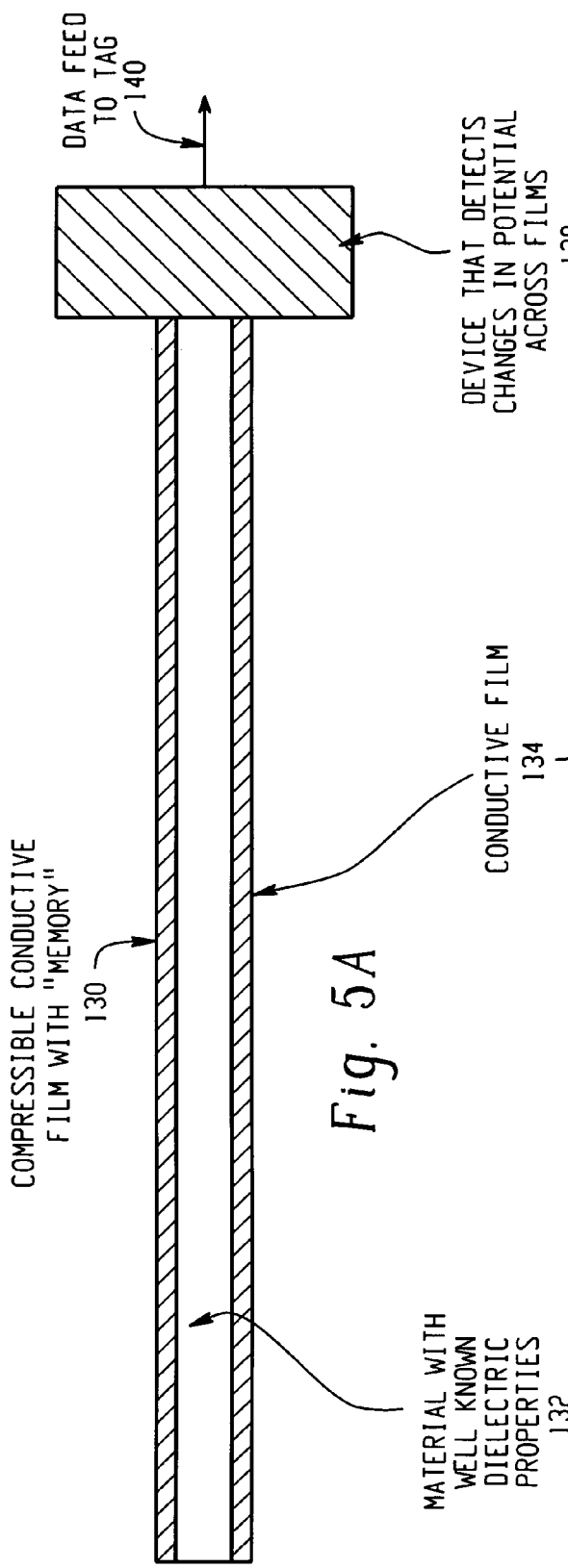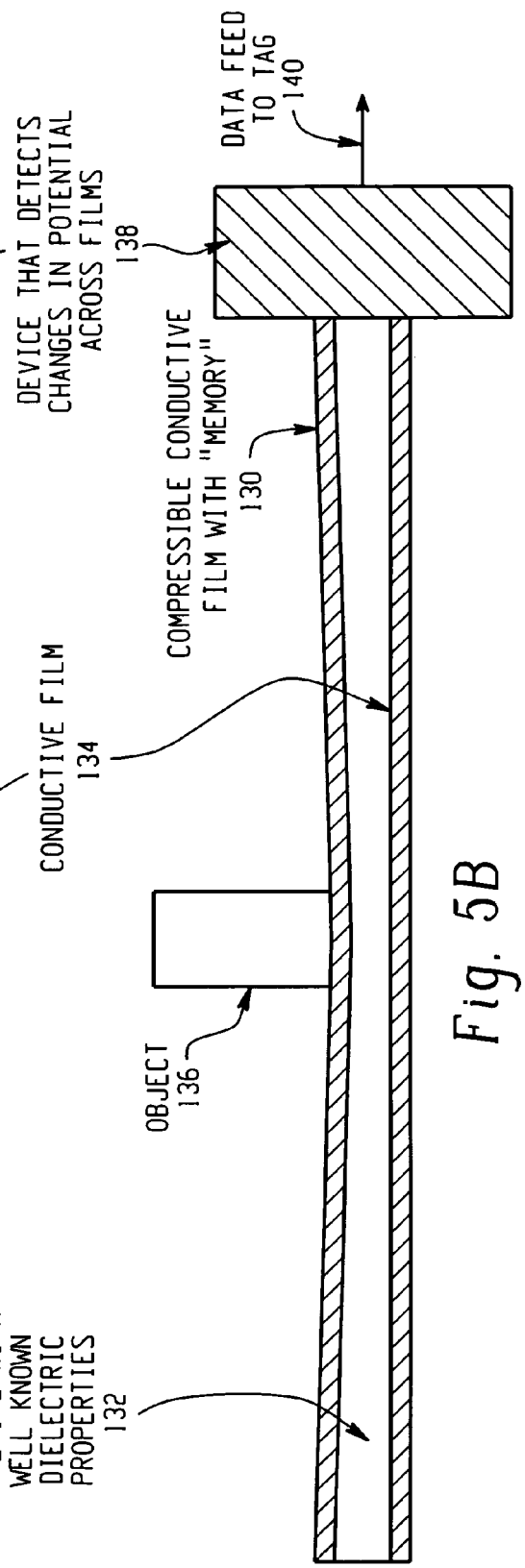

SYSTEMS AND METHODS FOR MONITORING OPEN STOCK MERCHANDISING

CROSS REFERENCE TO RELATED APPLICATIONS

This application is a continuation-in-part of U.S. application Ser. No. 11/281,283, titled "Low Stock Alert System," filed on Nov. 17, 2005, now U.S. Pat. No. 7,233,241 which claims the benefit of U.S. Provisional Application Ser. No. 60/629,496, filed on Nov. 19, 2004, and is also a continuation-in-part of U.S. application Ser. No. 11/281,859, titled "RF Contact Signal Detector," filed on Nov. 17, 2005, which claims the benefit of U.S. Provisional Patent Application No. 60/629,216, filed on Nov. 18, 2004. This application is also related to U.S. Pat. Nos. 6,837,427 and 7,021,535, which are incorporated herein by reference in their entirety. All applications are commonly assigned.

FIELD

The technology described herein relates generally to stocked product detection and monitoring systems. More particularly, systems and methods are provided for monitoring open stock merchandising.

BACKGROUND

Product manufacturers and/or retailers often desire to monitor the location of products displayed for sale in a retail environment, and particularly whether certain products are displayed adjacent to other products. Conditions regarding the adjacency of displayed products may even be written into agreements between the product manufacturer and the retailer. There is therefore a need for systems and methods that may be used to monitor the adjacency of stock within a retail environment.

Trade publications forecast widespread use of RFID tags on consumer products to complement the UPC (i.e., ePC) in a 5-15 year timeframe. However, such system is subject to the future development of a very inexpensive tag, cheaper and more effective readers, and full deployment of shelf-based antenna systems in retail outlets. Thus, sophisticated, inexpensive systems predicated on such use of the ePC (passive RFID tags applied to individual product items) are years away from being implemented.

Further, temporary displays are often discarded after only a few days or weeks, which means that stock-status detection equipment either would need to be disposable or very portable and easily redeployed by non-technical in-store personnel. When implemented, such systems may not cover certain types of product or packaging due to their challenging RF properties.

In applicant's commonly assigned and published application, US Pub. No. 2004/0056091, incorporated herein in its entirety, there is disclosed RF tags of various types (e.g., passive, semi-passive, active, and the like), Backscatter Reader Transmitters (BRT), and hubs. Typically, each BRT is a fully self-contained, battery operated unit, and utilizes three antennas. Two medium gain patch antennas are used to read the tags, and a whip antenna is used to report the received data over a wireless link to the hub. Active transmitter tags can have contacts or other sensors that allow them to function like "readers" by collecting data proximal to them and reporting directly to the hub. It would be advantageous to modify such system for detecting and monitoring the location and adjacency of stock in a retail environment.

SUMMARY

In accordance with the teachings described herein, systems and methods are described for monitoring open stock merchandising. A product label may be used that includes an electronic identification device that outputs information identifying one or more products to be stocked on one or more retail display structures, such as a shelf. A wireless communication device may be used that communicates with a wireless communication system. The product label also may include one or more connectors for electrically coupling the electronic identification device to the wireless communication device. The wireless communication device may be configured to receive the information identifying the one or more products via the one or more connectors and wirelessly communicate the information to the wireless communication system. The information may be used to determine if a first product is adjacent to a second product on one or more retail display structures.

BRIEF DESCRIPTION OF THE DRAWINGS

FIGS. 5a and 5b illustrate a weight-sensing film that measures changes in electric potential and can be laid on shelves to identify the presence of objects placed on it.

DETAILED DESCRIPTION

The system disclosed hereafter with reference to FIGS. 1-9 will be of value to retailers as well as manufacturers through its ability to inexpensively monitor and report presence/absence of displays that are placed into pre-specified locations.

Another retail issue is to be able to remotely monitor retail store shelf layouts and reset compliance. In particular, sales variance, in some cases, is believed to be due to stocking adjacencies or location. For example, placing antacids next to diarrhea medicine may create more sales than putting them next to stomach remedies.

Further, store plan-o-grams change periodically and it is desirable to know which stores have complied with a new layout at any given time.

Figure 1:
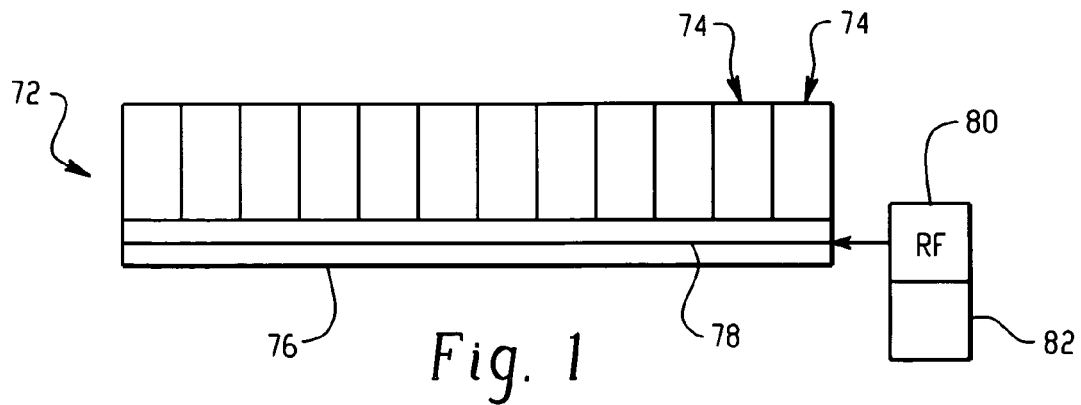
FIG. 1 is a schematic representation of a side view of an example monitoring device in which magnetic field strength is measured to detect the presence/absence of stocked product.
Figure 2:
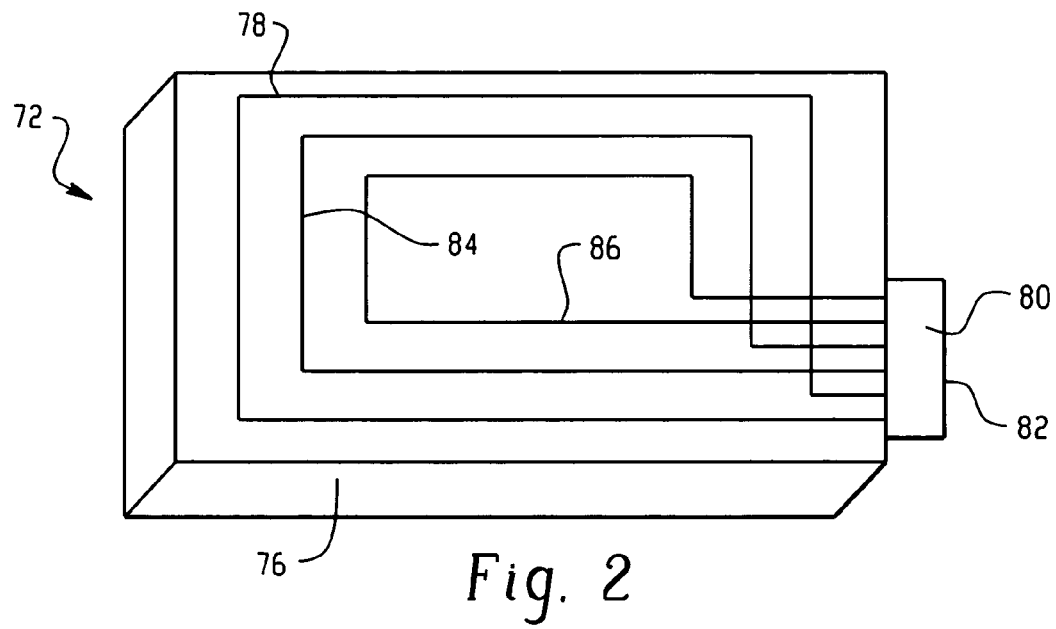
FIG. 2 is a plan view of the embodiment of FIG. 1, showing the use of a plurality of wire loops embedded in or attached to a display shelf to create the magnetic field strength that detects the presence/absence of stocked product.

Several technologies already exist for incorporation into the novel inventive "Out-of-Stock" monitoring. One such technology is shown in FIG. 1. The monitoring device 72 includes a plurality of product packages 74 placed on a shelf 76. The "shelf" 76, of course, can be any material containing product or items available to consumers, such as wooden shelves, corrugated cardboard sheets, sheet metal, and the like. One or more inexpensive wires 78 can be embedded in, laid on, or attached to the cardboard shelves to form one or more "loops" on each shelf as shown in FIG. 2. The wires 78 can also be embedded in plastic or other thin sheets that are adhered to or laid on the shelf 76. The one or more loops are coupled to a single tag 80 attached to the shelf (or shelves) 76. The loops of wire 78 can be spread along a shelf 76 to cover one or more sections of product display areas. The tag 80 contains display identification circuitry (well-known in the art) as a means 82 for deciphering small changes in the electromagnetic field associated with the wire 78. It may also be desirable to embed similar wire loops into thin plastic shelf liners that can be retrofitted to certain semi-permanent or permanent displays.

FIG. 2 is a plan view of the shelf 76 shown in FIG. 1 that illustrates the use of three wire loops 78, 84, and 86 embedded into a shelf or a shelf liner and connected to the tag 80 to determine presence/absence of stock on the shelf.

Figure 3:
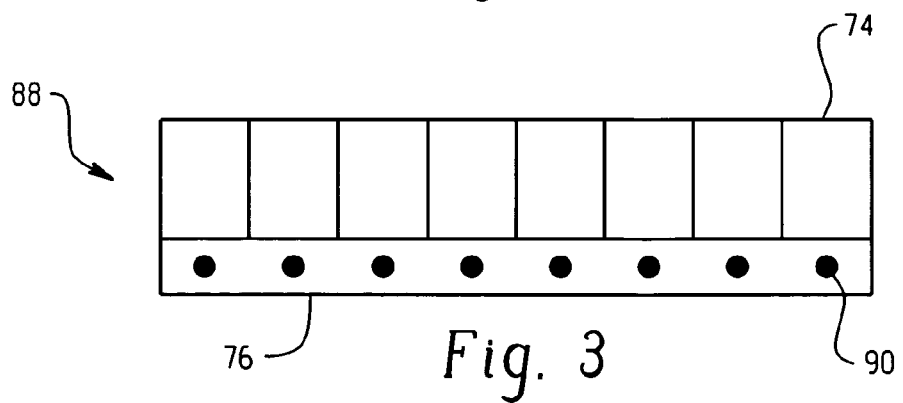
FIG. 3 is a side view of another example monitoring device in which the presence/absence of stocked product is detected by weight sensors embedded or associated with a display shelf holding product.
Figure 4:
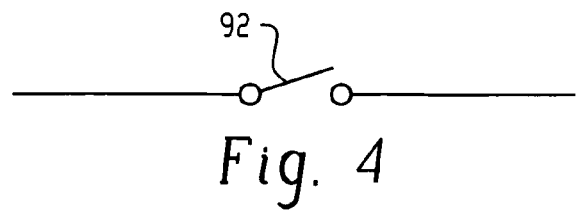
FIG. 4 is a schematic illustration of a micro-switch that could be embedded in or associated with the embodiment shown in FIG. 3, to perform the function of a weight sensor.

FIG. 3 illustrates another example monitoring device that utilizes weight sensors to detect weight or changes in weight and report status through voltage changes as is well known in the art. The system 88 shown in FIG. 3 includes a plurality of the products or product containers 74 that are again placed on a shelf, or shelf liner, 76. At least one weight sensor 90 is placed on, within, or attached to the shelf or shelf liner 76. Inexpensive micro-switches such as 92 shown in FIG. 4 may be sandwiched between layers of cardboard, for example only, for opening a simple circuit when an empty shelf condition occurs (or when tension on the switch is less than a pre-specified amount).

Another means of measuring weight, shown in FIGS. 5a and 5b, is a pair of thin conductive films 130 and 134, similar to plastic or Mylar, separated by a material 132 with well-known dielectric properties. The top film 130 is compressible, but has a memory that returns it to its original state as shown in FIG. 5a. This resistance to indentation from objects is well calibrated. The presence of an object 136 changes the resistance to electric potential across the films through an indentation as shown in FIG. 5b, and is measured through a device 138 that converts the changes to a data stream that is fed to a contact tag (not shown) through a cable 140.

Figure 6:
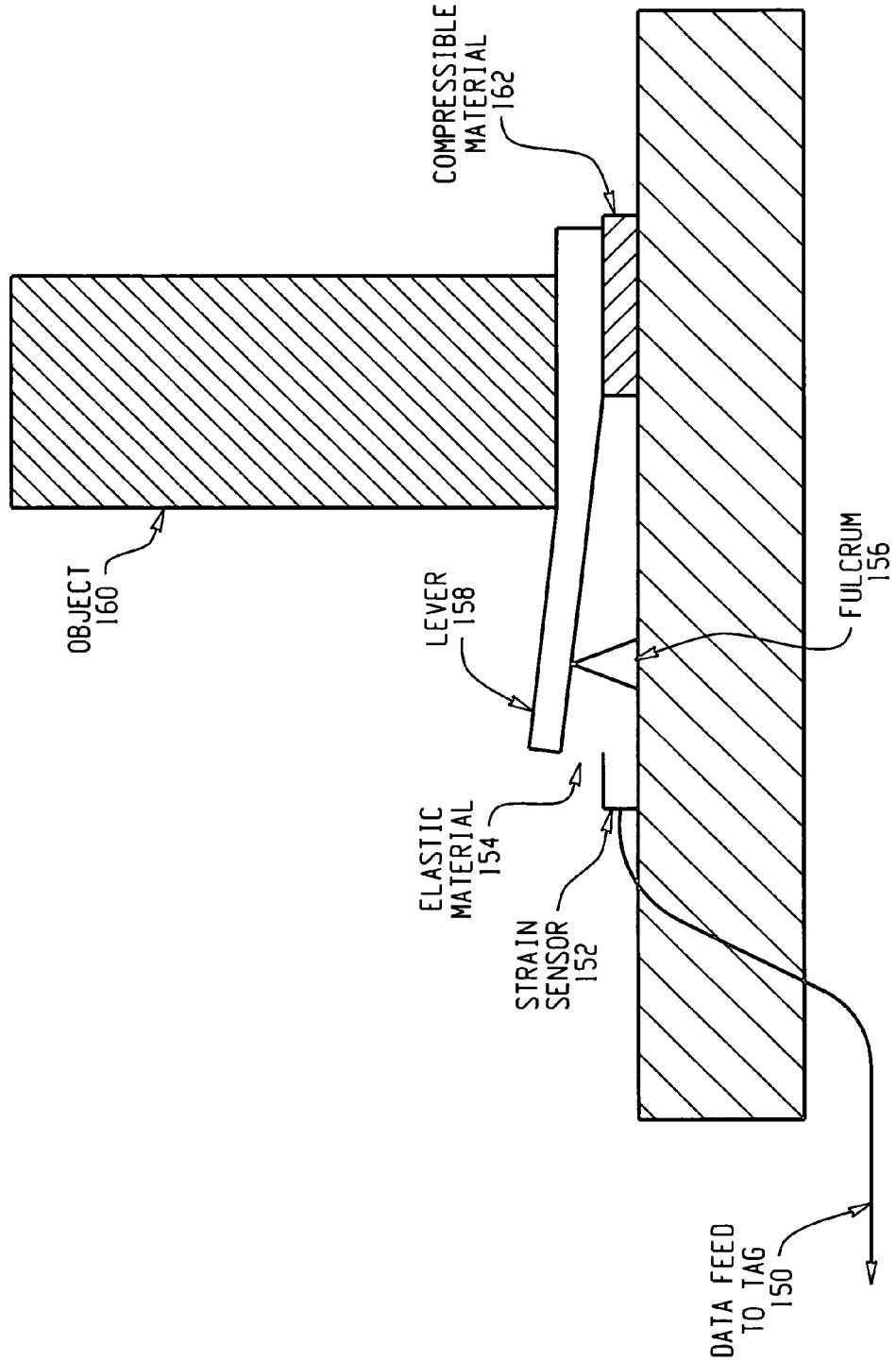
FIG. 6 is an illustration of a continuous-state device with wider dynamic range than the weight sensor of FIG. 4, which permits more refined readings concerning weight and weight changes based on a lever concept.

Alternately, more elaborate continuous-state devices with wider dynamic range can be inconspicuously embedded into reusable "bases" or platforms on which displays are placed. Such a system is shown in FIG. 6. This system permits more graduated readings about weight and weight changes. Lever 158 movement is limited by compressible material 162. A fulcrum 156 further lessens movement of an elastic material 154 that is strained by the presence of an object 160. A sensor 152 converts the slight movement to variable voltage, and then to data which is fed to a contact tag (not shown) through a cable 150. As with the other embodiments described herein, status conditions are then converted through an inexpensive tag into RF signals that can be detected by readers in a given facility for downstream reporting to a remote server as disclosed, for example, in a commonly assigned prior application published as US 2004/0056091, which in turn, can send a variety of alerts to interested personnel, websites, e-mail systems, voicemail, reorder information collection systems, and other means of notification.

Figure 7:
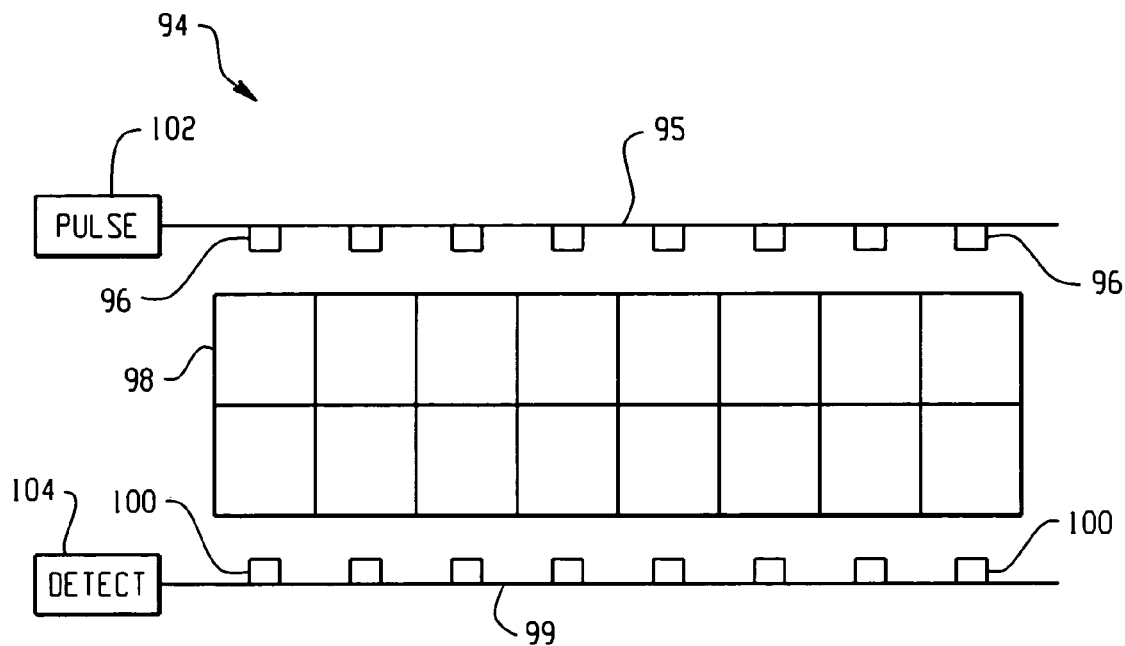
FIG. 7 illustrates still another example monitoring device in which optical sensors are used to detect the presence/absence of stocked product.

FIG. 7 illustrates another example monitoring device in which optical sensors are utilized to detect product presence/absence. Optical sensors are commonly used today in many manufacturing processes. These sensors suffice for the purposes of monitoring presence or absence of rows (or columns) of packaged product. As can be seen in FIG. 7, the system 94 comprises at least one but preferably a small re-usable strip 95 of lights 96, that are pulsed periodically (e.g., every three hours) in succession by pulser circuit 102. Opposite the lights, with the product 98 in rows (or columns) in between them, is a corresponding strip 99 of photoelectric cells 100. The presence of product 98 interrupts the light beam, or beams, causing one or more of the cells 100 to report a non-empty state. As multiple sensors within a display detect their corresponding lights, empty or non-empty states of rows (or columns) of products or near-empty states of a particular shelf would be detected by detector 104 (which could be a tag as described herein) and reported.

Figure 8:
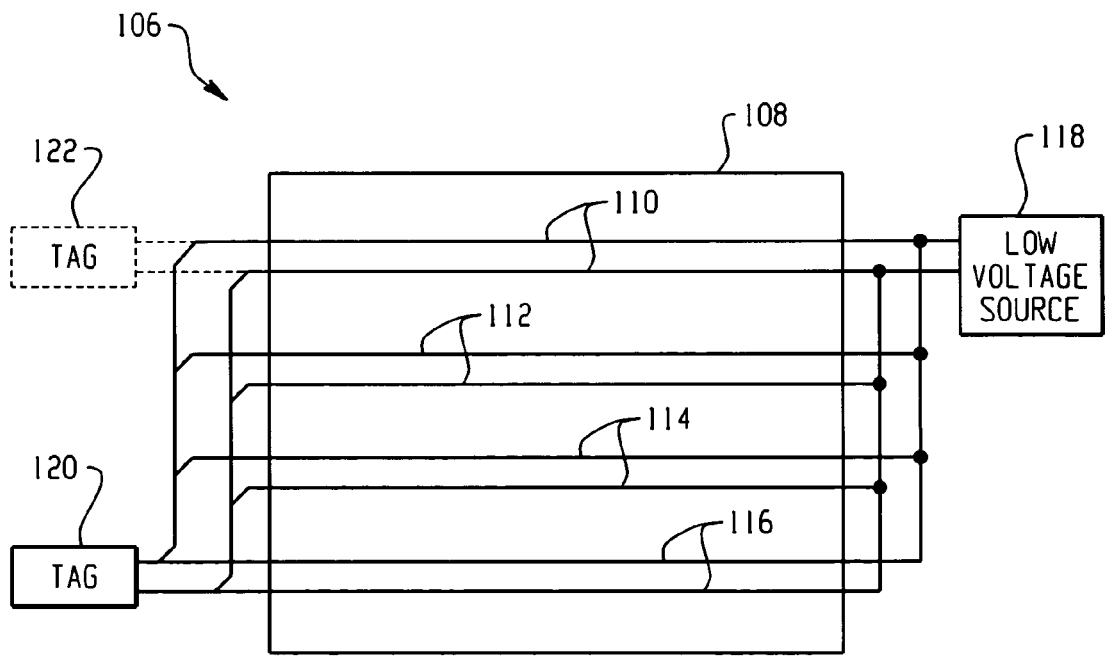
FIG. 8 illustrates yet another example monitoring device in which conductive contact sensors are used to detect the presence/absence of stocked product.

FIG. 8 discloses still another example monitoring device in which conductive contact sensors may be used to detect the presence/absence of product on a shelf. It is well-known that dielectric properties of product packaging varies with the product and the package. Thus, pairs of spaced wires 110, 112, 114, and 116 are placed on the surface 108 of display shelves to register changes in very low amperage/voltage (e.g. 5 volts or less) supplied by source 118. Such low amperage/voltage prevents any risk of shock, spark, or electrolysis of the product. When one or more packages of product rests on a slightly-separated (e.g., 1 inch apart) pair of wires, resistance across the pair is lowered and corresponding changes in voltage are noted by a small processor on the tag 120 coupled to each of the wire pairs 110, 112, 114, and 116. One tag may be used for all wire pairs or an individual tag 122 may be coupled to each wire pair separately. The changes in voltage noted by the tag 120 (or 122) are reported for evaluation.

Each of the approaches and methods named above has unique strengths and limitations. Periodic reads extend battery life and each device is sufficiently small to lessen conspicuity to store personnel or consumers. Further, any of these methods can be used in conjunction with a relatively inexpensive tag for reporting as described in the fore mentioned co-pending patent application. Such tags can be re-used or their cost would be inconsequential if they are discarded. In some cases, such as the optical and dynamic-range weight sensor, re-use of the sensor across displays would be desirable, necessitating some intervention by the person installing the display. In such a case, the connection between the reusable sensor and the tag on the display should be robust and simple, such as clipping a small cord into the equivalent of today's telephone jack.

A large percentage of the items that can be promptly replenished through store-door delivery, such as carbonated beverages or salty snacks, tend to have aluminum foil in their packaging to keep the product fresh and to lengthen shelf life of the product. Products in these categories are either packaged in aluminum cans or plastic bottles. It has long been known that metal tends to reflect radio waves and water tends to absorb them. A radio-based stock alert system that takes advantages of these absorption and reflection characteristics is highly desirable. These types of products or packages when placed in close proximity to a well matched transmission line cause a change in impedance in the line and a mismatch to occur. This mismatch causes the RF signals to reflect back to the source. These reflections are detected through a directional coupler and measured with a micro-controller.

Figure 9:
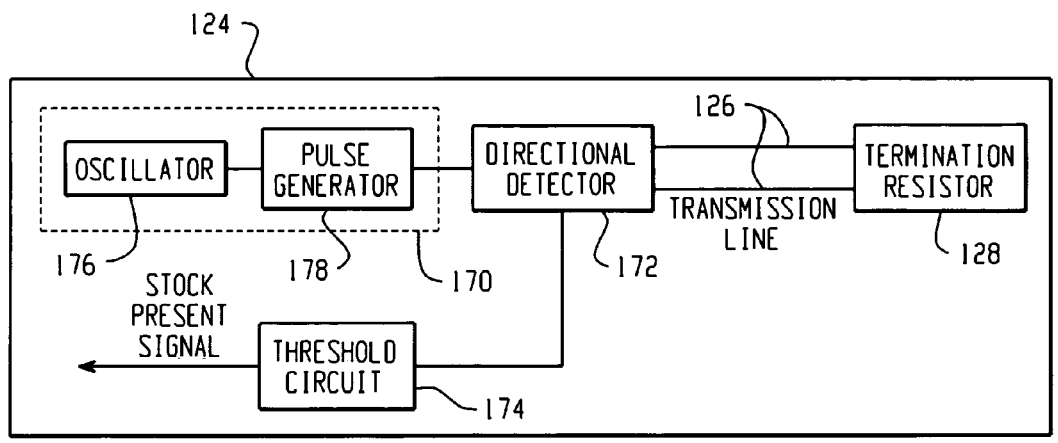
FIG. 9 illustrates a block diagram of an example system for providing a low stock alert in which a transmission line is fed an RF signal. The match on the transmission line is measured through a directional coupler and the shelf condition (empty or items present) can be determined. The line will be mismatched when items are present on the shelf.

FIG. 9 is a block diagram depicting an example stocked product detecting and monitoring system. The system 124 shown in FIG. 9 provides the new type of sensor, as set forth above, for detecting the presence of stock items placed on a shelf. The system 124 uses a transmission line 126 that has air on at least one side (such as a microstrip or parallel lines). This transmission line 126 is terminated at one end in a resistor 128 that is equal to the characteristic impedance of the transmission line. It is fed at the other end by an RF generator 170 and a directional detector 172. The stock is assumed to have radio wave properties, which, when placed in close proximity to a well matched transmission line, will cause a mismatch on the line. The signal generated by oscillator 176 and pulse generator 178 travels down the transmission line 126 and almost 100% of the signal is absorbed in the terminating resistor 128 at the end of the transmission line 126. With no product present, very little signal is reflected. The directional detector 172 measures reflected power and so its output is at a low value. If a conductive or radio-reflective item is placed on or near the transmission line, the capacitance associated with it will cause an impedance mismatch on the transmission line. This will result in some of the RF signal being reflected back toward the RF generator 170. This causes the output level of the direction detector 172 to rise. The threshold circuit 174 can be set to send a signal to a monitoring computer that there is at least some stock on the shelf. This circuit has been tested and functions quite reliably providing that the RF is swept over a fairly wide range. The reason for this is that the mismatch may vary with frequency (i.e., at any one frequency there may be a local good match). By performing the reflected power measurement over a wide frequency range, this effect is minimized. The oscillator 176 runs at a high frequency (e.g., several MHz, such as the clock oscillator for a microprocessor) and feeds pulse generator 178 that outputs very narrow pulses, such as a nanosecond in duration. These pulses have energy distributed over the RF spectrum up to around 1 GHz, and exhibit multiple peaks at harmonics of the oscillator frequency. The directional detector 172 is designed to function over a very broad band, such as 100 MHz to 1 GHz.

With no stock present, the output of the directional detector 172 is small; with stock present, the output of the detector 172 is higher. This allows a simple binary empty/not empty decision to be made by threshold circuit 174 about each shelf or region of a shelf on which the transmission lines are placed.

The heart of the system 124 is the transmission line 126 that picks up reflected signals. This must be designed so that some of the field associated with the transmission of RF energy protrudes into the space where the objects to be sensed are placed. Several different types of transmission lines are possible, but one of the most attractive is the microstrip. A microstrip line is easy and inexpensive to produce, inconspicuous, and has a ground plane on one side that acts as a shield from a similar monitoring loop located in an adjacent plane. Cardboard shelves commonly found on temporary merchandising displays make an excellent dielectric. The microstrip line can be fabricated by having one side of the shelf aluminized and the transmission line can be printed on the other side using conductive ink. For more permanent shelves, plastic can be used in lieu of cardboard, and wire or conductive tape may be used in lieu of conductive ink, making the detection unit more durable without adding significantly more expense. Multiple antennae may be connected to a single detector using an RF switch to allow a partial-stock condition to be reported.

Any item that disturbs the field produced by the transmission line can be sensed. Tests show that anything with a few square inches of conductive/reflective material (e.g. aluminized Mylar) can be readily detected. Aluminum beverage cans and non-metallic plastic bottles containing liquids also can be detected.

The advantages of using the transmission line approach include an easily fabricated microstrip using the shelf (cardboard or plastic) as the dielectric medium for the transmission line; covering the transmission line with a non-reflecting material such as paper thus making the transmission line inconspicuous; no mechanical parts to jam, wear out, or break; using inexpensive key components that are easy to produce and to deploy; and the use of the system in conjunction with an Active Transmitter Tag to report stock conditions regardless of where in the store it is deployed. In tests, the system has been able to detect objects as small as a U.S. quarter. Beverage cans and any aluminized plastic (e.g., candy bar wrapper) are easy to detect.

Thus, there has been disclosed a novel low stock alert system in which the presence/absence of stocked items is detected and the result transmitted to a remote server for analysis and comparison.

One system disclosed utilizes electromagnetic fields generated by conductive loops and affected by the placement of product to be monitored to be detected and analyzed to determine product presence/absence.

Still another system disclosed utilizes a weight sensing device for detecting the presence/absence of product.

Yet another embodiment has been disclosed that utilizes optics to determine the presence/absence of products stocked on shelves.

Also, another embodiment has been disclosed in which conductive contact sensors (wire pair) are used to detect the presence/absence of product by sensing a change in the resistance between wire pairs as product is removed or added.

An embodiment has also been disclosed in which a new type of sensor, an RF transmission line, is used to sense the presence/absence of stocked product.

Figure 10:
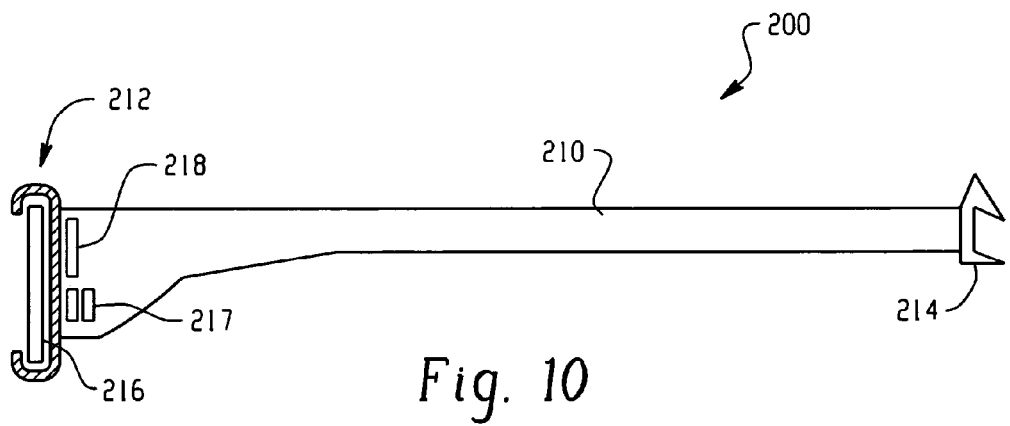
FIG. 10 depicts an example display shelf that includes a stock identification system, which may be used to monitor stock adjacencies in a retail environment.

FIG. 10 depicts an example display shelf 200 that includes a stock identification system, which may be used to monitor stock adjacencies in a retail environment. The display shelf 200 includes a shelf portion 210, a label bracket 212 and a mounting bracket 214. The mounting bracket 214 is configured to detachably mount the display shelf 200 to a shelving unit in the retail environment. The label bracket 212 defines a c-shaped slot that receives a product label 216. Also, a wireless communication device 218 and a battery 217 are attached to the label bracket 212.

Figure 11:
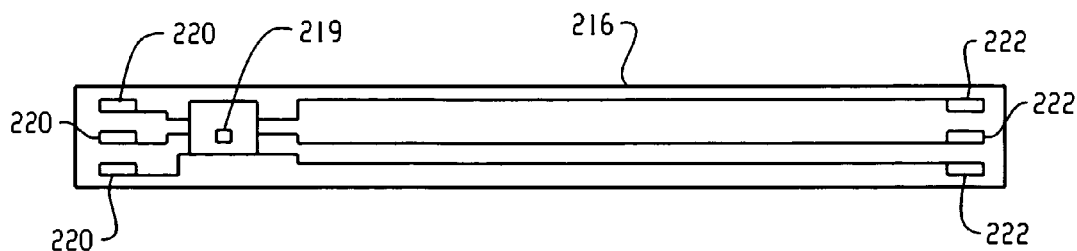
FIG. 11 shows a rear view of the product label shown in FIG. 10.

FIG. 11 shows a rear view of the product label 216. The product label 216 includes an electronic identification device 219 which identifies one or more products to be stocked on the display shelf 200. The product label 216 also includes one or more connectors 220 that electrically couple the electronic identification device 219 to the wireless communication device 218 when the product label is inserted in the label bracket 212. For instance, the connectors 220 may be configured to make electrical contact with corresponding connectors (not shown) within the label bracket 212. In addition, the product label 216 may also include one or more additional connectors 222 for electrically coupling the product label 216 to another product label on an adjacent shelf, for example as described below with reference to FIG. 13.

Figure 12:
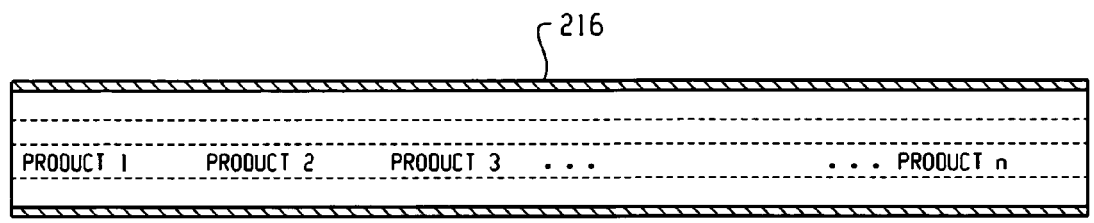
FIG. 12 shows a front view of the product label shown in FIG. 10.

FIG. 12 shows a front view of the product label 216. As illustrated, information identifying the one or more products to be stocked on the display shelf 200 may be printed on the front of the label 216. The label 216 may, for example, be a short strip that includes the name of a section of products, or it may be a longer strip (as illustrated) that identifies a plan-o-gram detail for a given shelf The label 216 may also include additional information, such as UPC's or SKU's associated with the products to be stocked on the shelf 200.

Referring again to FIGS. 10 and 11, the wireless communication device 218 may, for example, be an RFID tag that communicates with an RFID system. In one example, the RFID tag may "wake up" periodically (e.g., every 12 hours) to check for the presence of a label 216 and to communicate with the RFID system. One example RFID tag which may be used is described in commonly assigned U.S. patent application Ser. No. 11/417,768, which is incorporated herein by reference in its entirety.

The electronic identification device 219 may, for example, be a programmable device or some other means for electronically storing and conveying information regarding the product to be stocked on the shelf 200. In another example, the electronic identification device 219 may be pre-encoded with information, such as a unique serial number, which may be used to identify the product to be stocked on the shelf 200. For instance, a user may input information into a central database to associate the pre-encoded serial number with characteristics of the product label, such as brand, price, target dates for display, UPC's, and/or other information associated with products to be stocked on the shelf.

The battery 217 may be used to power the RFID tag 218 and/or the electronic identification device 219. In one example, the connectors 220 may include a contact to transmit power from the battery 217 to the electronic identification device 219, a ground contact, and a contact for transmitting serial data between the electronic identification device 219 and the wireless communication device 218. The connectors 220, 222, may be positioned at either end or both ends of the shelf 200. In addition, an antenna (not shown) for the wireless communication device 218 may also be attached to the shelf 200, for example, along the label bracket 212. The antenna may be tuned for a metal backplane provided by the label bracket 212.

In operation, the electronic identification device 219 outputs information via one or more of the connectors 220 that identifies the one or more products to be stocked on the display shelf 200. The information is received by the wireless communication device 218, which communicates the information to a wireless communication system. From the wireless communication system, the information, for example, may be transmitted to a central processing device (see, e.g., FIGS. 14 and 15). The information may then be used to monitor the products that are stocked on the display shelf 200 and/or to monitor the adjacency of products stocked on one or more display shelves.

In one example, information identifying products to be stocked on the shelf 200 may be wirelessly communicated to an RFID system by an RFID tag 218 along with a tag ID. The RFID system may be programmed to associate the tag ID with a predetermined location for the display shelf 200. This information may then be used to monitor which products are stocked at each shelf location in a retail environment. In one alternative embodiment, the RFID system may determine from the RFID tag 218 the location of the shelf 200 in the retail environment, and the location information may be used along with the information from the product label 216 to monitor which products are stocked at each shelf location.

Figure 13:
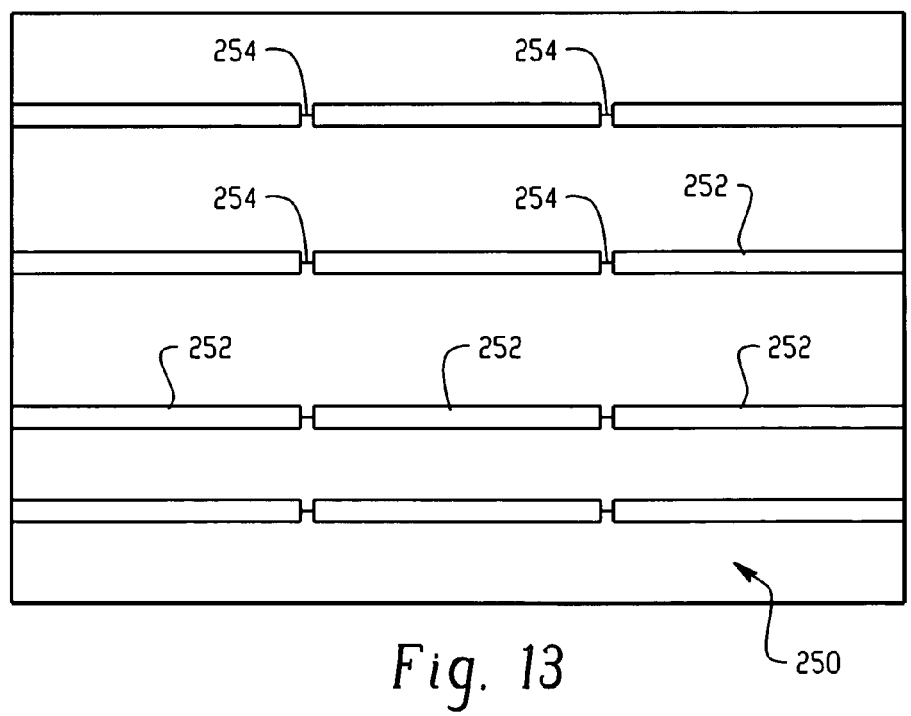
FIG. 13 depicts a retail product shelving unit that includes four rows of product shelves.

In one example, the product label 216 may be long enough to span two or more adjacent shelves arrayed at the same height. In this manner, stock adjacencies from shelf to shelf may be identified using a single product label 216. Alternatively, the additional contacts 222 may be used to electrically couple product labels 216 on two or more adjacent shelves, as shown in FIG. 13. If two or more product labels are electrically coupled, then each product label may also output information identifying one or more products to be stocked on adjacent shelves.

FIG. 13 depicts a retail product shelving unit 250 that includes four rows of product shelves 252. The product labels 216 on the shelves 252 in each row are electrically coupled 254 to product labels on adjacent shelves. Adjacent product labels may, for example, be coupled using one or more connectors on the product labels, as shown in FIG. 11. In another example, additional contacts could be included on the sides of the shelves to electrically couple adjacent shelves. Other means for connecting adjacent product labels could also be used. As described above, the electrical connection 254 between adjacent shelves may be used to enable each product label to output information identifying one or more products that are to be stocked on an adjacent shelf. Alternatively, the information output from each product label may provide an identification number for one or more adjacent shelves, and the identification number may be used by a central processing device to determine stock adjacencies from shelf to shelf.

Figure 14:
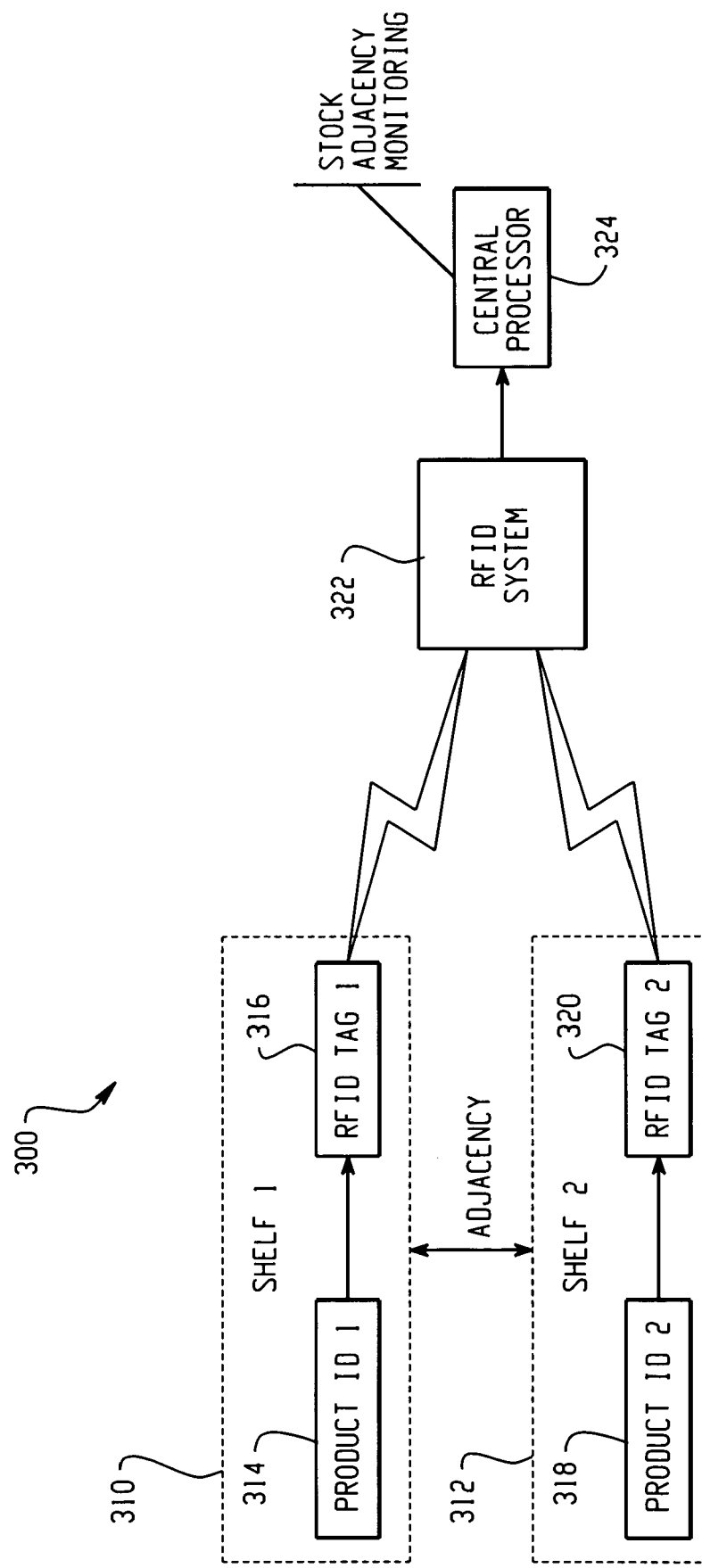
FIG. 14 is a block diagram depicting an example system for monitoring stock adjacencies in a retail environment.

FIG. 14 is a block diagram depicting an example system 300 for monitoring stock adjacencies in a retail environment. The system 300 includes two or more product display shelves 310, 312. Each shelf 310, 312 includes a product identification device 314, 318 that communicates information to an RFID tag 316, 320 indicating one or more products to be stocked on the shelf 310, 312. In one example, the product identification devices 314, 318 may also identify one or more adjacent shelves and/or stock information for one or more adjacent shelves.

The RFID tags 316, 320 communicate the product information to an RFID system 322, along with tag information identifying the RFID tag 316, 320 within the RFID system 322 (e.g., a tag number). The tag information may, for example, be used to associate the RFID tags 316, 320 with particular display shelves. In certain embodiments, the RFID system 322 also may be configured to determine the location of an RFID tag 316, 320 and its associated shelf 310, 312 within the retail environment.

The information transmitted from the RFID tags 316, 320 may be communicated via the RFID system 322 to one or more central processing devices 324. The central processing device 324 may use the information to monitor which products are being stocked at certain locations within the retail environment and/or to monitor which products are being stocked adjacent to other products. The central processor 324 may, for example, monitor stock adjacencies on an individual shelf and also stock adjacencies from shelf to shelf.

The central processor 324 may, for example, determine which shelves are adjacent based on location information provided by the RFID system 322. For example, the RFID system 322 may store location information associated with each RFID tag 316, 320, or may be configured to actively determine the location of an RFID tag 316, 320 within the retail environment. Alternatively, information identifying adjacent shelves may be provided by the product identification devices 314, 318 and transmitted to the central processor 324 along with the product information. Other methods for providing shelf adjacency information to the central processor 324 are also possible.

Figure 15:
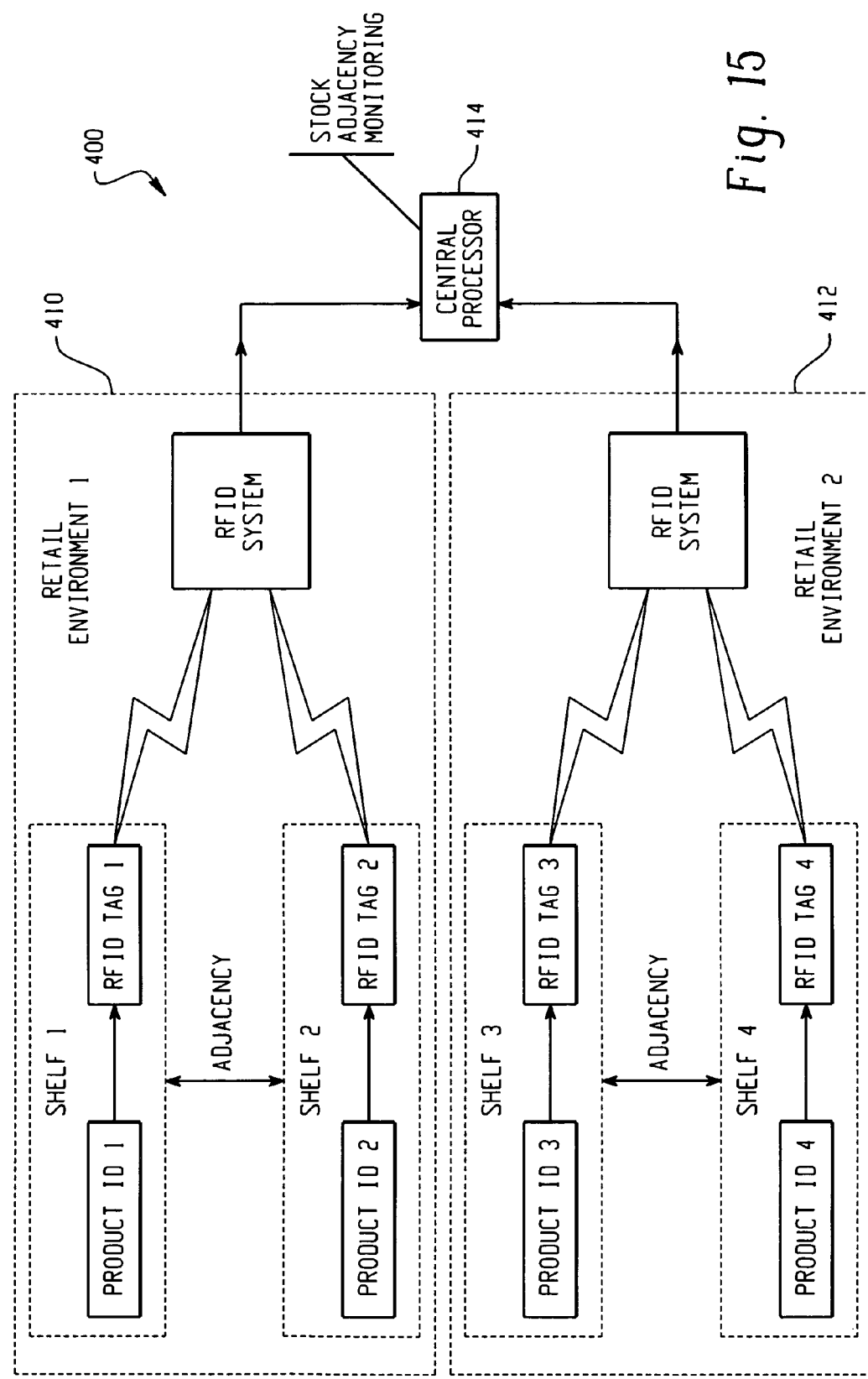
FIG. 15 is a block diagram depicting an example system for monitoring stock adjacencies across multiple retail environments.

FIG. 15 is a block diagram depicting an example system 400 for monitoring stock adjacencies across multiple retail environments 410, 412. This system 400 is similar to the system 300 of FIG. 14, except that the central processor(s) 414 is located remotely from the retail environments 410, 412. The central processor(s) 414 may, for example, receive data from the RFID systems in each retail environment 410, 412 over a network or telephone connection. The central processor(s) 414 may then use the information received from the different retail environments to monitor stock adjacency data and/or other product stocking information across multiple stores.

Figure 16:
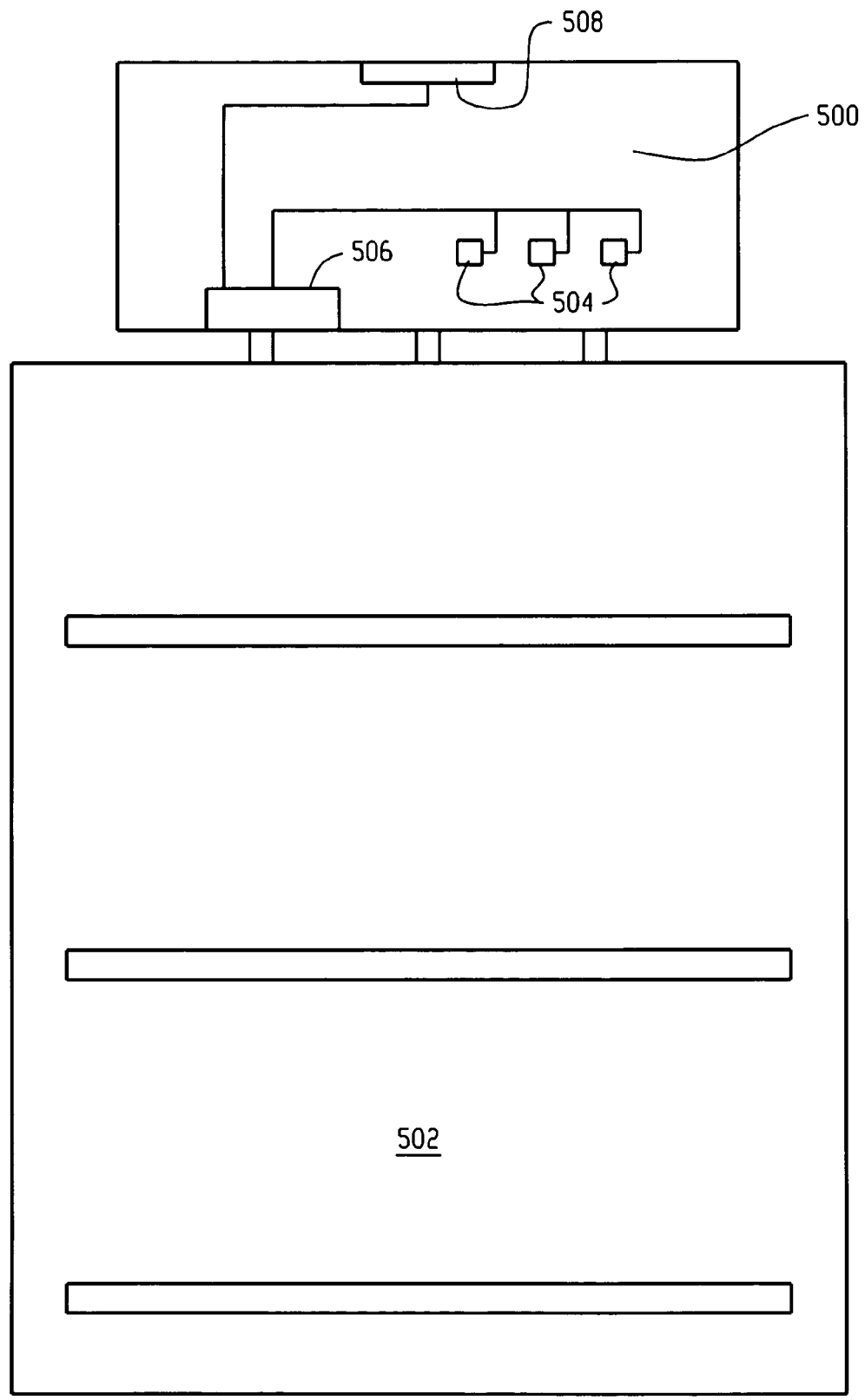
FIG. 16 depicts one alternative embodiment of a stock monitoring system.

It should be understood that the term "product label," as used herein, may include a strip label, as illustrated in FIGS. 10-12, but may also include other structures for identifying products in a retail environments. For example, FIG. 16 depicts one alternative embodiment in which the product label is a sign that attaches to a sign holder 500. The sign holder 500 may be attached to a shelving unit 502, for example on the end-cap portion of a retail shelving unit. A product label could, however, also be attached to other display structures, such as a gondola, a mobile rack, a dump bin, a temporary merchandising area, a cooler or freezer, or other retail display structures.

The sign holder 500 depicted in FIG. 16 includes a plurality of contacts 504 for electrically coupling an electronic identification device on a product label (not shown) to a wireless communication device 506 when the product label is attached to the sign holder 506. The contacts 504 may, for example, include two contacts for supplying power to the electronic identification device and a contact for transmitting serial data between the electronic identification device and the wireless communication device 506. A battery or other power source may also be attached to the sign to power the wireless communication device 506 and/or to supply power to the electronic identification device via the contacts 504. Also illustrated is an RF antenna 508 attached to the sign holder.

This written description uses examples to disclose the invention, including the best mode, and also to enable a person skilled in the art to make and use the invention. The patentable scope of the invention may include other examples that occur to those skilled in the art.

It is further noted that the systems and methods described herein may be implemented on various types of computer architectures, such as for example on a single general purpose computer or workstation, or on a networked system, or in a client-server configuration, or in an application service provider configuration.

It is further noted that the systems and methods may include data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It is claimed:

1. A stock identification system, comprising:
   a product label that includes an electronic identification device, the electronic identification device storing information identifying one or more products to be stocked on one or more retail display structures; and
   a wireless communication device attached to the one or more retail display structures that communicates with a wireless communication system;
   the product label further including one or more connectors for electrically coupling the electronic identification device to the wireless communication device when the product label is coupled to the one or more retail display structures;
   the wireless communication device receiving the information identifying the one or more products via the one or more connectors and wirelessly communicating the information to the wireless communication system; and wherein the electronic identification device is configured to transmit the stored information from the product label to the wireless communication system via the wireless communication device.

2. The stock identification system of claim 1, wherein the one or more retail display structures include one or more shelves.

3. The stock identification system of claim 2, wherein the information is used to determine if a first product is adjacent to a second product on the one or more shelves.

4. The stock identification system of claim 1, wherein the wireless communication device is a radio frequency identification (RFID) tag and the wireless communication system is an REID system.

5. The stock identification system of claim 4, wherein the RFID system determines a location of the RFID tag within a retail environment.

6. The stock identification system of claim 5, wherein the information and the location of the RFID tag are used to determine if the one or more products on a first shelf are adjacent to one or more other products on a second shelf.

7. The stock identification system of claim 2, wherein the one or more shelves include a label bracket for receiving the product label.

8. The stock identification system of claim 1, wherein the one or more retail display structures include a sign holder for detachably mounting the product label to the retail display structure.

9. The stock identification system of claim 2, wherein the one or more shelves include a mounting brackets for detachably mounting the shelves to a shelving unit.

10. The stock identification system of claim 2, wherein:
the electronic identification device is electrically coupled to a second electronic identification device on an adjacent shelf;
the electronic identification device receiving adjacency information from the second identification device that identifies one or more products to be stocked on the adjacent shelf; and
the electronic identification device communicating the adjacency information to the wireless communication system via the wireless communication device.

11. The stock identification system of claim 10, wherein the product label includes one or more additional connectors for electrically coupling the electronic identification device to the second electronic identification device.

12. The stock identification system of claim 1, further comprising:
a battery attached to the one or more retail display structures, the battery being electrically coupled to the one or more connectors when the product label is coupled to the one or more retail display structures to provide power to the electronic identification device.

13. The stock identification system of claim 1, wherein the wireless communication device communicates the information to the wireless communication system at periodic intervals.

14. The stock identification system of claim 3, further comprising:
one or more processing devices that receive the information from the wireless communication system and use the information to determine if the first product is adjacent to the second product on the one or more shelves.

15. The stock identification system of claim 14, wherein the one or more shelves are located in a first retail environment and the one or more processing devices also receive stock adjacency information from one or more different retail environments.

16. The stock identification system of claim 2, wherein the product label is coupled to at least two shelves.

17. A method for monitoring stock adjacency in a retail environment, comprising:
programming an electronic identification device in a product label with information that identifies one or more products to be stocked on one or more retail display structures in the retail environment;
attaching the product label to the one or more retail display structures;
transmitting the information from the electronic identification device in the product label to a wireless communication device attached to the one or more retail display structures; and 18. The method of claim 17, further comprising: the one or more processors using the information to determine if a first product is adjacent to a second product on the one or more retail display structures.

19. The method of claim 17, wherein the wireless communication device is a radio frequency identification (RFID) tag and the wireless communication system is an RFID system.

20. The method of claim 19, wherein the REID system determines a location of the REID tag within a retail environment.

21. The method of claim 19, wherein the information and the location of the REID tag are used to determine if the one or more products on a first shelf are adjacent to one or more other products on a second shelf.

22. The method of claim 18, further comprising:
receiving adjacency information from an adjacent shelf; and
communicating the adjacency information to the one or more processors via the wireless communication system, wherein the information and the adjacency information is used to determine if the first product is adjacent to the second product.

23. A stock adjacency monitoring system, comprising:
a first product label including a first electronic identification device that stores first information identifying a first product to be stocked on a first shelf;
a first wireless communication device attached to the first shelf that communicates with a wireless communication;
the first product label electrically coupling the first electronic identification device to the first wireless communication device when the first product label is attached to the first shelf;
the first wireless communication device receiving the first information from the first electronic identification device and wirelessly communicating the first information to a processing device via the wireless communication system;
wherein the first electronic identification device is configured to transmit the stored first information from the first product label to the wireless communication system via the first wireless communication device;
a second product label including a second electronic identification device that stores second information identifying a second product to be stocked on a second shelf;
a second wireless communication device attached to the second shelf that communicates with the wireless communication;
the second product label electrically coupling the second electronic identification device to the second wireless communication device when the second product label is attached to the second shelf;

the second wireless communication device receiving the second information from the second electronic identification device and wirelessly communicating the second information to the processing device via the wireless communication system;

wherein the second electronic identification device is configured to transmit the stored first information from the second product label to the wireless communication system via the second wireless communication device;

the processing device determining from the first and second information that the first product is stocked adjacent the second product.

24. The stock identification system of claim 1, wherein the information identifying one or more products is stored in the electronic identification device on the product label before the product label is coupled to the one or more retail display structures.

25. The method of claim 17, wherein the product label is attached to the one or more retail display structures after the electronic identification device in the product label is programmed.

26. The stock adjacency monitoring system of claim 23, wherein the first information is stored in the first electronic identification device before the first product label is attached to the first shelf, and the second information is stored in the second electronic identification device before the second product label is attached to the second shelf.

* * * * *

UNITED STATES PATENT AND TRADEMARK OFFICE
CERTIFICATE OF CORRECTION

PATENT NO. : 7,535,337 B2
APPLICATION NO. : 11/500075
DATED : May 19, 2009
INVENTOR(S) : Overhultz et al.

Page 1 of 1

It is certified that error appears in the above-identified patent and that said Letters Patent is hereby corrected as shown below:

In column 11, line 14, delete "REID" and insert -- RFID --.

In column 17, line 17, after the word "and" insert a paragraph and then insert -- wirelessly communicating the information from the wireless device to one or more processors via a wireless communication system. --.

In column 12, line 18, after "comprising:", insert a paragraph.

In column 12, line 25, delete "REID" and insert -- RFID --.

In column 12, line 26, delete "REID" and insert -- RFID --.

In column 12, line 29, delete "REID" and insert -- RFID --.

Signed and Sealed this

Twenty-third Day of June, 2009

JOHN DOLL
*Acting Director of the United States Patent and Trademark Office*